United States Patent [19]

Ishino et al.

[11] Patent Number: 5,684,694

[45] Date of Patent: Nov. 4, 1997

[54] SYSTEM FOR CONTROLLING A HYDROSTATIC-MECHANICAL TRANSMISSION WHEN AN OIL PRESSURE EXCEEDS A RELIEF PRESSURE

[75] Inventors: Tsutomu Ishino, Osaka; Ryoichi Maruyama, Kanagawa; Yuichi Nagahiro, Osaka, all of Japan

[73] Assignee: Kabushiki Kaisha Komatsu Seisakusho, Tokyo, Japan

[21] Appl. No.: 389,169

[22] Filed: Feb. 15, 1995

[30] Foreign Application Priority Data

Feb. 18, 1994 [JP] Japan ................. 6-021572

[51] Int. Cl.$^6$ .......................................... F16D 31/02
[52] U.S. Cl. .............. 364/424.08; 60/431; 60/449; 475/76
[58] Field of Search .............. 364/424.1, 424.08, 364/424.07; 60/431, 420, 428, 430, 437, 438, 445, 449, 490, 492; 475/72, 76, 80

[56] References Cited

U.S. PATENT DOCUMENTS

| | | | |
|---|---|---|---|
| 3,733,931 | 5/1973 | Nyman et al. | 477/69 |
| 3,803,843 | 4/1974 | Nyman et al. | 60/445 |
| 3,890,783 | 6/1975 | Allen et al. | 60/420 |
| 3,946,560 | 3/1976 | MacIntosh et al. | 60/421 |
| 5,394,698 | 3/1995 | Takagi et al. | 60/438 |
| 5,406,793 | 4/1995 | Maruyama et al. | 60/431 |
| 5,423,183 | 6/1995 | Folsom | 60/492 |
| 5,486,142 | 1/1996 | Folsom | 474/69 |

FOREIGN PATENT DOCUMENTS

| | | |
|---|---|---|
| 62-31660 | 7/1982 | Japan . |
| 4-191558 | 7/1992 | Japan . |

Primary Examiner—Collin W. Park
Attorney, Agent, or Firm—Armstrong, Westerman, Hattori, McLeland & Naughton

[57] ABSTRACT

A control system designed such that if a heavy load is imposed on a vehicle during running and a hydraulic relief state in which an oil pressure in a hydraulic circuit for a hydrostatic transmission unit exceeds a relief pressure is detected, the angle of a discharge controlling swash plate for a pump is reduced to a specified value (e.g., 50% of the maximum angle) or less, whereby the stall of the vehicle and the overheat of machine parts are prevented.

6 Claims, 6 Drawing Sheets

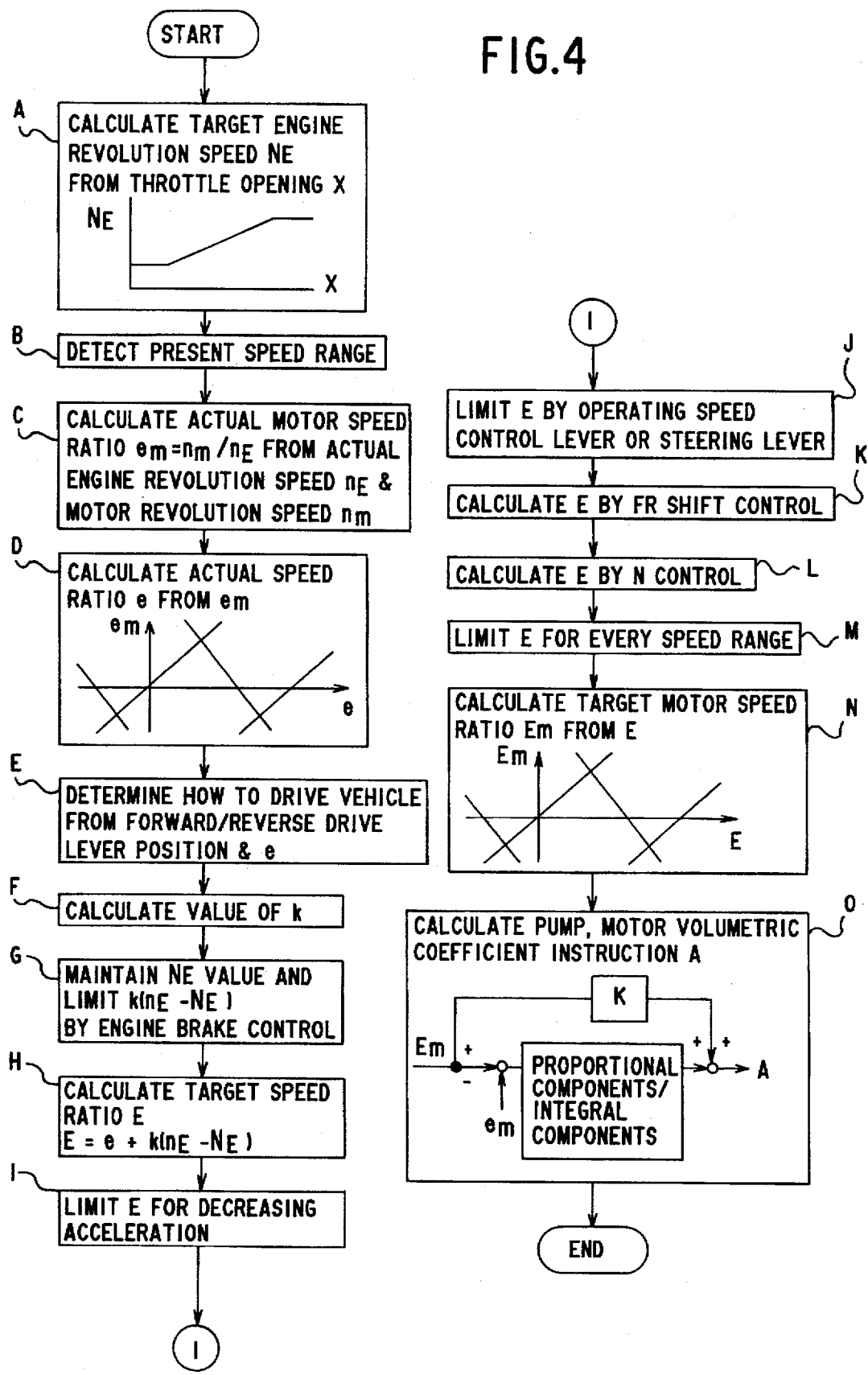

SYSTEM FOR CONTROLLING A HYDROSTATIC-MECHANICAL TRANSMISSION WHEN AN OIL PRESSURE EXCEEDS A RELIEF PRESSURE

BACKGROUND OF THE INVENTION (1) Field of the Invention

The invention relates to a system for controlling a hydrostatic-mechanical transmission in a tracklaying vehicle such as bulldozers, and more particularly, to a technique for controlling a hydrostatic-mechanical transmission when an oil pressure in the hydraulic circuit of the hydrostatic transmission unit exceeds a relief pressure.

(2) Description of the Prior Art

One known control system for hydrostatic-mechanical transmissions is disclosed in Japanese Patent Publication No. 62-31660 (1987). According to the system taught by this publication, the angle of a swash plate for controlling the discharge of a pump in the hydrostatic transmission unit is adjusted according to the difference between a target engine revolution speed calculated from a throttle position and an actual engine revolution speed so as to make the actual engine revolution speed close to the target engine revolution speed.

SUMMARY OF THE INVENTION

The prior art control system described above, however, exhibits poor response because of feedback control in which the difference between actual and target engine revolution speeds is used to obtain an amount that adjusts the swash plate for controlling the discharge of a pump in the hydrostatic transmission unit.

In order to solve this problem, we have proposed a control system disclosed in Japanese Patent Application No. 2-323930 (1990) (now published as Japanese Patent Publication for Laid Open No.4-191558 (1992)), in which a target motor speed ratio (=the ratio of the revolution speed of the motor for the hydrostatic transmission unit to the revolution speed of the power source) is computed and the angle of the swash plate for controlling the discharge of the pump in the hydrostatic transmission unit is adjusted by feed forward control using the target motor speed ratio.

When a bulldozer, which employs a hydrostatic-mechanical transmission incorporating the above control system therein, performs heavy-load work such as removing obstructive lying-stones, ripping or digging and piling up soil, a heavy load is very often imposed on the vehicle with the result that an oil pressure in the hydraulic circuit of the hydrostatic transmission unit exceeds a relief pressure. The relationship between the tractive force (F) of the vehicle and the motor oil pressure (P) is described by the following equation (a):

$$F \propto q_m \times P \qquad (a)$$

where $q_m$ is the volumetric efficiency of the motor.

If the hydraulic circuit is brought into a "hydraulic relief state" in which an oil pressure in the hydraulic circuit exceeds a relief pressure, the revolution speed of the motor for the hydrostatic transmission unit will not rise more than a certain value. For increasing the revolution speed of the motor, feedback control is so performed as to decrease the motor volumetric efficiency ($q_m$). It is obvious from the equation (a) that, as the motor volumetric efficiency ($q_m$) decreases, the motor oil pressure (P) increases. The increase in the motor oil pressure (P) enhances the hydraulic relief state. As a result, the motor is brought to a stop, causing the stall of the vehicle and the overheat of the machine parts due to an increase in oil temperature.

The present invention has been made in consideration of the foregoing problems and therefore one of the objects of the invention is to provide a system for controlling a hydrostatic-mechanical transmission, which is capable of maintaining machine parts in a good condition by preventing overheat even if the hydraulic circuit for the hydrostatic transmission unit is brought into "the hydraulic relief state".

This and other objects can be achieved by a control system according to the invention for controlling a hydrostatic-mechanical transmission when an oil pressure in a hydraulic circuit for a hydrostatic transmission unit of the transmission exceeds a relief pressure, the hydrostatic-mechanical transmission being equipped with a mechanical transmission unit actuated through an input shaft connectable to a power source; the hydrostatic transmission unit which is connectable to the input shaft and comprises a pump and motor having their respective discharge controlling swash plates, the angle of at least either of the swash plates being variable; and a differential unit for actuating both the mechanical transmission unit and the hydrostatic transmission unit by connecting an output shaft thereto, the control system comprising as shown in the principle diagram of FIG. 1:

(a) relief state detecting means (1) for detecting that the hydraulic circuit is in a hydraulic relief state in which the oil pressure in the hydraulic circuit exceeds the relief pressure; and (b) relief control means (2) for reducing the angle of the discharge controlling swash plate for the pump to a specified value or less, when the hydraulic relief state is detected by the relief state detecting means (1).

In the control system of the invention, if a heavy load is imposed on the vehicle during moving so that the relief state detecting means (1) detects that the hydraulic circuit for the hydrostatic transmission unit is in the hydraulic relief state in which an oil pressure in the hydraulic circuit exceeds a relief pressure, the relief control means (2) reduces the angle of the swash plate for controlling the discharge of the pump to a specified value or less (e.g., 50% of its maximum angle). This prevents the stall of the vehicle caused by the hydraulic relief state and the overheat of machine parts.

For ensuring the detection of the hydraulic relief state, it is preferable that the relief state detecting means (1) detects that the hydraulic circuit is in the hydraulic relief state if the revolution speed of the motor does not increase when a signal for instructing the actuation of the discharge controlling swash plate for the pump is issued.

Preferably, the relief control means (2) not only reduces the angle of the discharge controlling swash plate for the pump to the specified value or less, but also actuates an automatic brake and disengages hydraulic clutches in the mechanical transmission unit in order to shift the transmission into a lower speed range, if the relief state detecting means (1) detects that the hydraulic circuit is in the hydraulic relief state, during moving of a vehicle in a high speed.

With such an arrangement, in a case that the oil pressure exceeds the relief pressure as the vehicle rolls in a high speed (e.g., 2nd speed) and this brings the vehicle to a stall, the tractive force of the vehicle can be resumed by shifting the transmission to a lower speed (e.g., 1st speed) so that the vehicle can be moved off again in this low speed.

The aforesaid specified value is preferably 50% of the maximum angle of the discharge controlling swash plate.

Preferably, the relief control means (2) fixes the angle of the discharge controlling swash plate for the motor at its maximum value, if the hydraulic relief state is detected by the relief state detecting means (1).

The control system preferably includes relief control interrupting means (3) for interrupting the control performed by the relief control means (2) if in a condition in which the angle of the discharge controlling swash plate for the pump is reduced to the specified value or less by the relief control means (2), if either the revolution speed of the motor increases or if a forward/reverse drive lever is operated. The provision of the relief control interrupting means (3) enables the vehicle to smoothly resume the normal control after released from the hydraulic relief state.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and accompanying drawings which are given by way of illustration only, and thus are not limitative of the present invention, and wherein:

FIGS. 1 to 6 provide illustrations of an embodiment of a control system according to the invention for controlling a hydrostatic-mechanical transmission when an oil pressure exceeds a relief pressure;

FIG. 1 is a diagram showing the principle of the invention;

FIG. 2 is a diagram showing the structure of the hydrostatic-mechanical transmission according to one embodiment of the invention;

FIG. 3 is a graph of actual motor speed ratio verses actual speed ratio;

FIG. 4 is a flow chart of engine revolution speed control;

FIG. 6 is a flow chart of relief controls.

DESCRIPTION OF THE PREFERRED EMBODIMENT

Referring now to the accompanying drawings, the system for controlling the hydrostatic-mechanical transmission when an oil pressure exceeds a relief pressure will be described according to one embodiment of the invention.

Figure 2:
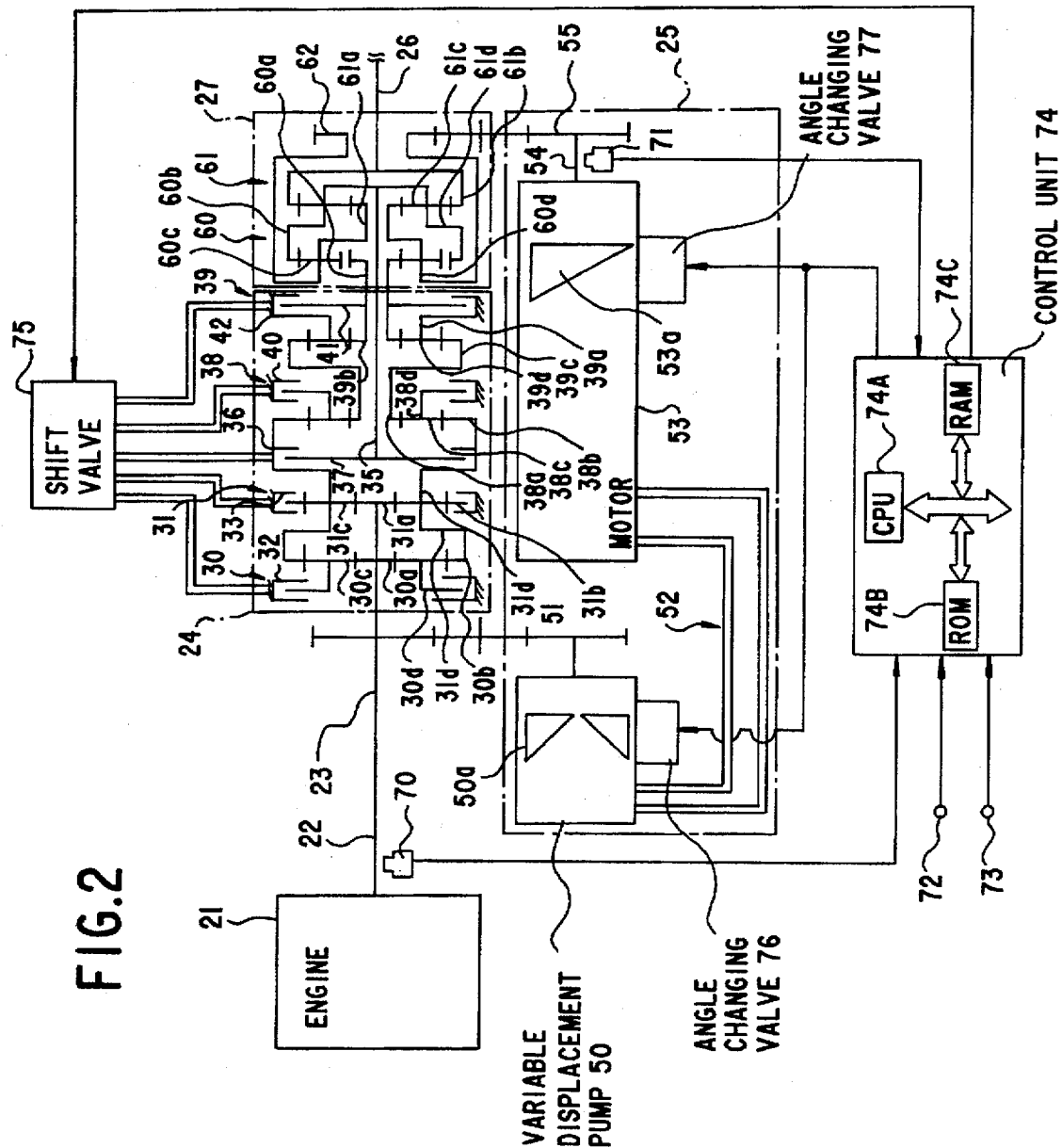

In FIG. 2, there are provided a mechanical transmission unit 24 which includes a gear box for providing three forward speeds and three reverse speeds, and a hydrostatic transmission unit 25 having a hydraulic pump-motor. These units 24 and 25 are connected to an input shaft 23 in such a manner that power transmitted from an engine 21 can be split, the input shaft 23 being connected coaxially to an output shaft 22 of the engine 21 which is employed as one example of the power source for the system of the invention. There is also provided a differential unit 27 that selectively connects an output shaft 26 to both the mechanical transmission unit 24 and the hydrostatic transmission unit 25, or to the hydrostatic transmission unit 25 only, for driving.

The mechanical transmission unit 24, hydrostatic transmission unit 25 and differential unit 27 will be hereinafter described in that order.

(1) Mechanical Transmission Unit 24

Referring to FIG. 2, the input shaft 23 is provided with a reverse planetary gear train 30 and a forward planetary gear train 31. The gear trains 30 and 31 are of the single planetary type and are aligned in an axial direction of the input shaft 23 in this order when enumerating from the left. The reverse planetary gear train 30 is composed of a sun gear 30a fixedly attached to the input shaft 23; a ring gear 30b positioned outside the sun gear 30a; a planet gear 30c that is in mesh with the gears 30a and 30b, being positioned therebetween; and a planet carrier 30d that is for the planet gear 30c and can be hydraulically braked by a reverse hydraulic clutch 32. Similarly, the forward planetary gear train 31 is composed of a sun gear 31a fixedly attached to the input shaft 23; a ring gear 31b that is positioned outside the sun gear 31a and can be hydraulically braked by a forward hydraulic clutch 33; a planet gear 31c that is in mesh with the gears 31a and 31b, being positioned therebetween; and a planet carrier 31d that is for the planet gear 31c and is integral with the ring gear 30b of the reverse planetary gear train 30.

There is provided an intermediate shaft 35 positioned coaxially with and in an extending direction of the input shaft 23. In FIG. 2, the intermediate shaft 35 is provided, at the left end thereof, with a clutch plate 37 that is hydraulically connectable by a 2nd-speed hydraulic clutch 36. The 2nd-speed hydraulic clutch 36 is formed integrally with the planet carrier 31d of the forward planetary gear train 31. The intermediate shaft 35 is also provided with a first 3rd-speed planetary gear train 38 and a second 3rd-speed planetary gear train 39. The gear trains 38 and 39 are of the single planetary type and are aligned in an axial direction of the intermediate shaft 35 in this order when enumerating from the left of FIG. 2.

The first 3rd-speed planetary gear train 38 is composed of a sun gear 38a rotatably supported by the intermediate shaft 35; a ring gear 38b that is positioned outside the sun gear 38a, being integral with the planet carrier 31d of the forward planetary gear train 31 and the 2nd-speed hydraulic clutch 36; a planet gear 38c that is in mesh with the gears 38a and 38b, being positioned therebetween; and a planet carrier 38d that is for the planet gear 38c and can be hydraulically braked by a 3rd-speed hydraulic clutch 40. Similarly, the second 3rd-speed planetary gear train 39 is composed of a sun gear 39b that is rotatably supported by the intermediate shaft 35, being integral with a clutch plate 41; a ring gear 39c that is positioned outside the sun gear 39b, being integral with the sun gear 38a of the first 3rd-speed planetary gear train 38; a planet gear 39d that is in mesh with the gears 39b and 39c, being positioned therebetween; and a fixed planet carrier 39e that is for the planet gear 39d and is integral with a 1st-speed hydraulic clutch 42 for hydraulically connecting the clutch plate 41.

It is to be noted at this time, that, generally, a hydraulic circuit includes a relief (safety) valve, and is designed to allow the escape of oil when the internal pressure of the circuit is beyond a specified level; thereby, preventing an increase in the internal pressure for the safety of the system.

In hydraulic actuation, the motor is driven by oil discharged from the pump. The mount of oil flowing in the motor (motor revolution speed) at that time is in conformity with the discharge amount of the pump. Since oil is released by the relief valve when the internal pressure of the circuit becomes higher or equal to a relief pressure, the amount of oil flowing in the motor (motor revolution speed) becomes unequal to the discharge amount of the pump.

A sensor for sending hydraulic pressure is usually used for detecting the pressure relief state of the circuit, whereas the invention proposes the use of oil revolution sensor instead of such a hydraulic pressure sensor in sensing that the above oil amounts differ from each whereby the pressure relief state can be detected.

(2) Hydrostatic Transmission Unit 25

The input shaft 23 is coupled through a gear train 51 to a variable displacement pump 50 having a discharge controlling variable-angle swash plate 50a which can be inclined both in the positive and negative directions. The variable displacement pump 50 is connected, through a pair of conduits 52 consisting of an outgoing path and a return path, to a variable displacement motor 53 having a discharge controlling variable-angle swash plate 53a which can be inclined in one direction. The variable displacement motor 53 has an output shaft 54 connected to a gear train 55. The discharge controlling variable-angle swash plates 50a and 53a provided in the variable displacement pump 50 and the variable displacement motor 53 are designed such that the revolution speed of the variable displacement pump 50 and that of the variable displacement motor 53 vary according to variations in the angles of the discharge controlling variable-angle swash plates 50a and 53a, as described below.

The revolution speed of the variable displacement pump 50 is specified, and the discharge controlling variable-angle swash plate 53a of the variable displacement motor 53 is inclined at a maximum tilt angle. In the above condition, as the tilt angle of the discharge controlling variable-angle swash plate 50a of the variable displacement pump 50 is inclined from zero in the positive direction, the revolution speed of the variable displacement motor 53 increases from zero in the positive direction. Then, the tilt angle of the discharge controlling variable-angle swash plate 50a of the variable displacement pump 50 is set to a maximum positive value. In this condition, as the tilt angle of the discharge controlling variable-angle swash plate 53a of the variable displacement motor 53 is decreased, the revolution speed of the variable displacement motor 53 further increases in the positive direction.

On the other hand, as the tilt angle of the discharge controlling variable-angle swash plate 50a of the variable displacement pump 50 is inclined from zero in the negative direction with the discharge controlling variable-angle swash plate 53a of the variable displacement motor 53 being inclined at a maximum tilt angle, the revolution speed of the variable displacement motor 53 decreases from zero in the negative direction. Then, the tilt angle of the discharge controlling variable-angle swash plate 50a of the variable displacement pump 50 is set to a maximum negative value. In this condition, as the tilt angle of the discharge controlling variable-angle swash plate 53a of the variable displacement motor 53 is decreased, the revolution speed of the variable displacement motor 53 further decreases in the negative direction.

(3) Differential Unit 27

Referring to FIG. 2, the intermediate shaft 35 is provided, at the right end thereof, with a first differential planetary gear train 60 of the double planetary type and a second differential planetary gear train 61 of the single planetary type. These gear trains 60 and 61 are aligned coaxially with and in an extending direction of the intermediate shaft 35 in this order when enumerating from the left. The first differential planetary gear train 60 is composed of a sun gear 60a that is rotatably supported by the intermediate shaft 35, being integral with the sun gear 39b of the second 3rd-speed planetary gear train 39 and the clutch plate 41; a ring gear 60b positioned outside the sun gear 60a; a planet gear 60c that is in mesh with either of the gears 60a and 60b, being positioned therebetween; and a planet carrier 60d that is for the planet gear 60c and is integral with an input gear 62 connected through the gear train 55 to the output shaft 54 of the variable displacement motor 53 in the hydrostatic transmission unit 25. Similarly, the second differential planetary gear train 61 is composed of a sun gear 61a that is rotatably supported by the intermediate shaft 35, being integral with the planet carrier 60d of the first differential planetary gear train 60; a ring gear 61b that is positioned outside the sun gear 61a, being integral with the output shaft 26 positioned (at the right hand in FIG. 2) coaxially with and in an extending direction of the intermediate shaft 35; a planet gear 61c that is in mesh with the gears 61a and 61b, being positioned therebetween; and a planet carrier 61d that is for the planet gear 61c and is integral with the ring gear 60b of the first differential planetary gear train 60 and the intermediate shaft 35.

Figure 1:
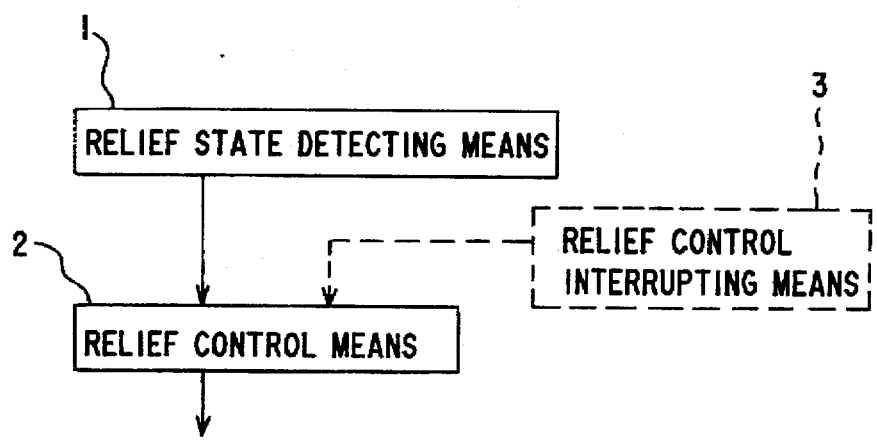
Figure 3:
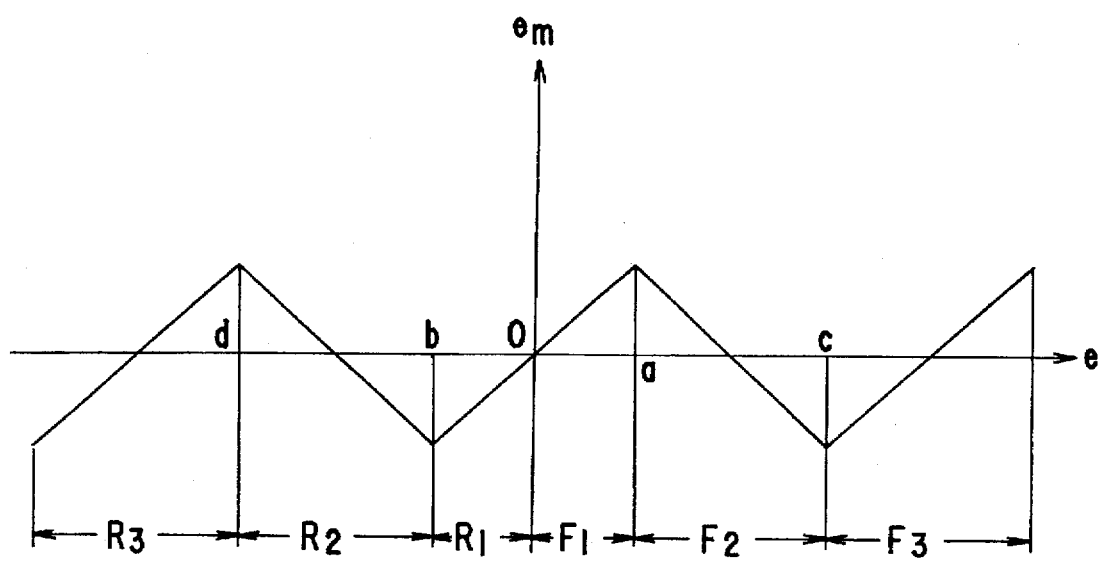

There will be given an explanation on the mechanical operations of the mechanical transmission unit 24, hydrostatic transmission unit 25 and differential unit 27. FIG. 3 shows the relationship between speed ratio and motor speed ratio in the respective speed ranges (i.e., 1st forward speed (F1); 2nd forward speed (F2); 3rd forward speed (F3); 1st reverse speed (R1); 2nd reverse speed (R2); and 3rd reverse speed (R3)). The above speed ratio is the ratio of the revolution speed of the output shaft 26 to the revolution speed of the output shaft 22 of the engine 21 (=the revolution speed of the engine) and the above motor speed ratio is the ratio of the revolution speed of the output shaft 54 of the variable displacement motor 53 (=the revolution speed of the motor) to the revolution speed of the output shaft 22 of the engine 21 (=the revolution speed of the engine).

(i) 1st forward speed (F1) and 1st reverse speed (R1):

Only the 1st-speed hydraulic clutch 42 is engaged. The engagement of the clutch 42 causes the sun gear 60a of the first differential planetary gear train 60 to be hydraulically braked through the clutch plate 41 and the intermediate shaft 35 to be in a freely rotated state. Accordingly, only the torque of the variable displacement hydraulic motor 53 in the hydrostatic transmission unit 25 is transmitted to the output shaft 54 of the variable displacement hydraulic motor 53; the gear train 55; the input gear 62, the planet carrier 60d, the planet gear 60c and the ring gear 60b of the first differential planetary gear train 60, the planet carrier 61d, the planet gear 61c and the ring gear 61b of the second differential gear train 61 in the differential unit 27; and the output shaft 26 in that order. In short, the output shaft 26 is driven, being connected only to the hydrostatic transmission unit 25 by means of the differential unit 27.

As the motor speed ratio is thus increased from zero in the positive direction, the revolution speed of the output shaft 26 increases from zero in the positive direction. On the other hand, as the motor speed ratio decreases from zero in the negative direction, the revolution speed of the output shaft 26 also decreases from zero in the negative direction. Thus, the speed ratio is infinitely varied both in the positive and negative directions within a specified range.

In 1st forward speed (F1) and 1st reverse speed (R1), the 2nd speed hydraulic clutch 36 may be engaged, or disengaged. However, when taking into account the case where the vehicle may be shifted to 2nd forward speed (F2)or 2nd reverse speed (R2) by clutch operation, the 2nd-speed hydraulic clutch 36 is preferably engaged.

In 1st speed, when the revolution speed of the output shaft 26 increases in the positive direction and the speed ratio is a specified positive value a, the relative revolution speed of the forward hydraulic clutch 33 in relation to the ring gear 31b of the forward planetary gear train 31 becomes zero. In this condition, if the forward hydraulic clutch 33 is engaged and the 1st-speed hydraulic clutch 42 is disengaged, 2nd forward speed (F2) will be obtained. At that time, the 2nd-speed hydraulic clutch 36 is engaged. In 1st speed, when the revolution speed of the output shaft 26 decreases in the negative direction and the speed ratio is a specified negative value b, the relative revolution speed of the reverse hydraulic clutch 32 in relation to the planet carrier 30d of the reverse planetary gear train 30 becomes zero. In this condition, if the reverse hydraulic clutch 32 is engaged and the 1st-speed hydraulic clutch 42 is disengaged like the above case, 2nd reverse speed (R2) will be obtained. At that time, the 2nd-speed hydraulic clutch 36 is engaged.

(ii) 2nd forward speed (F2)

Since the clutch plate 37 is hydraulically connected by the engagement of the 2nd-speed hydraulic clutch 36 and the ring gear 31b of the forward planetary gear train 31 is hydraulically braked by the engagement of the forward hydraulic clutch 33, the torque of the input shaft 23 is transmitted to the forward planetary gear train 31, the 2nd-speed hydraulic clutch 36 and the intermediate shaft 35 in the mechanical transmission unit 24, and then to the second differential planetary gear train 61 in the differential unit 27. During the transmission, the revolution speed is reduced. The torque of the variable displacement motor 53 in the hydrostatic transmission unit 25 is also transmitted to the output shaft 54 of the variable displacement motor 53, the gear train 55, the input gear 62, the planet carrier 60d of the first differential planetary gear train 60 and then to the second differential planetary gear train 61 in the differential unit 27, while the revolution speed being reduced. The second differential planetary gear train 61 connects the mechanical transmission unit 24 and the hydrostatic transmission unit 25, whereby their revolution speeds are combined to drive the output shaft 26.

Thus, the motor speed ratio decreases thereby increasing the revolution speed of the output shaft 26 in the positive direction.

When the motor speed ratio is positive in 2nd forward speed (F2), part of torque from the second differential planetary gear train 61 in the differential unit 27 flows backwardly to the input gear 62 through the planet gear 61c, and the sun gear 61a of the second differential planetary gear train 61 and the first differential planetary gear train 60 so that the variable displacement motor 53 performs its pumping operation. The pumping operation of the variable displacement motor 53 causes the variable displacement pump 50 to be driven, and the torque of the variable displacement pump 50 is transmitted through the gear train 51 to the input shaft 23 where the torque is combined with the torque of the engine 21.

When the motor speed ratio is negative on the other hand, part of the torque of the input shaft 23 drives the variable displacement pump 50 through the gear train 51. The actuation of the variable displacement pump 50 actuates the variable displacement motor 53 whose torque is transmitted to the gear train 55, the input gear 62 etc. in the differential unit 27, and then to the second differential planetary gear train 61 in the differential unit 27. At the second differential planetary gear train 61, the transmitted torque is combined with torque from the mechanical transmission unit 24 to drive the output shaft 26.

In 2nd forward speed (F2), when the speed ratio is increased to a specified value c, the relative revolution speed of the 3rd-speed hydraulic clutch 40 in relation to the planet carrier 38d of the first 3rd-speed planetary gear train 38 becomes zero. In this condition, if the 3rd-speed hydraulic clutch 40 is engaged and the 2nd-speed hydraulic clutch 36 is disengaged, 3rd forward speed (F3) will be obtained.

In 2nd forward speed (F2), when the speed ratio decreases from a higher value to the specified value a, the relative revolution speed of the 1st-speed hydraulic clutch 42 in relation to the clutch plate 41 becomes zero. In this condition, if the 1st-speed hydraulic clutch 42 is engaged and the forward hydraulic clutch 33 is disengaged, 1st forward speed (F1) will be obtained.

(iii) 3rd forward speed (F3)

Since the planet carrier 38d of the first 3rd-speed planetary gear train 38 is hydraulically braked by the engagement of the 3rd-speed hydraulic clutch 40 and the ring gear 31b of the forward planetary gear train 31 is hydraulically braked by the engagement of the forward hydraulic clutch 33, the torque of the input shaft 23 is transmitted through the forward planetary gear train 31, the 2nd-speed hydraulic clutch 36, the first 3rd-speed planetary gear train 38 and the second 3rd-speed planetary gear train 39 in the mechanical transmission unit 24 to the first and second differential planetary gear trains 60 and 61 in the differential unit 27, while the revolution speed being reduced. Also, the torque of the variable displacement motor 53 in the hydrostatic transmission unit 25 is transmitted through the output shaft 54 of the variable displacement motor 53 and the gear train 55 to the first and second differential planetary gear trains 60 and 61 in the differential unit 27, while the revolution speed being reduced. The first and second differential planetary gear trains 60 and 61 connect the mechanical transmission unit 24 and the hydrostatic transmission unit 25, whereby their revolution speeds are combined to drive the output shaft 26.

As the motor speed ratio is thus increased, the revolution speed of the output shaft 26 increases in the positive direction.

When the motor speed ratio is negative in 3rd forward speed (F3), part of torque from the first and second differential planetary gear trains 60 and 61 in the differential unit 27 flows backwardly to the input gear 62 so that the variable displacement motor 53 performs its pumping operation and the torque of the variable displacement motor 53 is transmitted, as described above, through the variable displacement pump 50 and the gear train 51 to the input shaft 23 where the transmitted torque is combined with the torque of the engine 21.

When the motor speed ratio is positive on the other hand, part of the torque of the input shaft 23 drives the variable displacement pump 50 through the gear train 51, and the torque of the variable displacement motor 53 is transmitted, as described above, through the gear train 55 and the input gear 62 etc. in the differential unit 27 to the first and second differential planetary gear trains 60 and 61 in the differential unit 27. At the first and second differential planetary gear trains 60 and 61, the torque is combined with torque from the mechanical transmission unit 24 to drive the output shaft 26.

In 3rd forward speed (F3), when the speed ratio decreases from a higher value to the specified value c, the relative revolution speed of the 2nd-speed hydraulic clutch 36 in relation to the clutch plate 37 becomes zero. In this condition, if the 2nd-speed hydraulic clutch 36 is engaged and the 3rd-speed hydraulic clutch 40 is disengaged, 2nd forward speed (F2) will be obtained.

(iv) 2nd reverse speed (R2)

Since the clutch plate 37 is hydraulically connected by the engagement of the 2nd-speed hydraulic clutch 36 and the planet carrier 30d of the reverse planetary gear train 30 is hydraulically braked by the engagement of the reverse hydraulic clutch 32, the torque of the input shaft 23 is transmitted through the reverse planetary gear train 30, the 2nd-speed hydraulic clutch 36 and the intermediate shaft 35 in the mechanical transmission unit 24 to the second differential planetary gear train 61 in the differential unit 27, while the revolution speed being reduced. The torque of the variable displacement motor 53 in the hydrostatic transmission unit 25 is transmitted, as described above, through the output shaft 54 of the variable displacement motor 53, the gear train 55, the input gear 62 and the planet carrier 60d of the first differential planetary gear train 60 in the differential unit 27 to the second differential planetary gear train 61, while the revolution speed being reduced. The first differential planetary gear train 61 connects the mechanical transmission unit 24 and the hydrostatic transmission unit 25 thereby combining their revolution speeds to drive the output shaft 26.

As the motor speed ratio is increased accordingly, the revolution speed of the output shaft 26 decreases in the negative direction.

In 2nd reverse speed (R2), when the motor speed ratio is negative, part of torque from the second differential planetary gear train 61 in the differential unit 27 flows backwardly to the hydrostatic transmission unit 25 so that the variable displacement motor 53 performs its pumping operation. When the motor speed ratio is positive, the operation to be carried out is the same as that described in the case of 2nd forward speed (F2), except that a partial flow of the torque of the input shaft 23 toward the hydrostatic transmission unit 25 occurs.

In 2nd reverse speed (R2), when the speed ratio decreases from a higher value to a specified value d, the relative revolution speed of the 3rd-speed hydraulic clutch 40 in relation to the planet carrier 38d of the first 3rd-speed planetary gear train 38 becomes zero. In this condition, if the 3rd-speed hydraulic clutch 40 is engaged and the 2nd-speed hydraulic clutch 36 is disengaged, 3rd reverse speed (R3) will be obtained.

When the speed ratio is increased to the specified value b in 2nd reverse speed (R2), the relative revolution speed of the 1st-speed hydraulic clutch 42 in relation to the clutch plate 41 becomes zero. In this condition, if the 1st-speed hydraulic clutch 42 is engaged and the reverse hydraulic clutch 32 is disengaged, 1st reverse speed (R1) will be obtained.

(v) 3rd reverse speed (R3)

Since the planet carrier 38d of the first 3rd-speed planetary gear train 38 is hydraulically braked by the engagement of the 3rd-speed hydraulic clutch 40 and the planet carrier 30d of the reverse planetary gear train 30 is hydraulically braked by the engagement of the reverse hydraulic clutch 32, the torque of the input shaft 23 is transmitted through the reverse planetary gear train 30, the 2nd-speed hydraulic clutch 36, the first 3rd-speed planetary gear train 38 and the second 3rd-speed planetary gear train 39 in the mechanical transmission unit 24 to the first and second differential planetary gear trains 60 and 61 in the differential unit 27, while the revolution speed being reduced. Also, the torque of the variable displacement motor 53 in the hydrostatic transmission unit 25 is transmitted, as described above, through the output shaft 54 of the variable displacement motor 53 and the gear train 55 to the first and second differential planetary gear trains 60 and 61 in the differential unit 27, while the revolution speed being reduced. The first and second differential planetary gear trains 60 and 61 connect the mechanical transmission unit 24 and the hydrostatic transmission unit 25 thereby combining their revolution speeds to drive the output shaft 26.

As the motor speed ratio is decreased accordingly, the revolution speed of the output shaft 26 decreases in the negative direction.

In 3rd reverse speed (R3), when the motor speed ratio is positive, part of torque from the first and second differential planetary gear trains 60 and 61 in the differential unit 27 flows backwardly to the hydrostatic transmission unit 25 so that the variable displacement motor 53 performs its pumping operation. When the motor speed ratio is negative, the operation to be carried out is the same as that described in the case of 3rd forward speed (F3), except that a partial flow of the torque of the input shaft 23 toward the hydrostatic transmission unit 25 occurs.

In 3rd reverse speed (R3), when the revolution speed ratio is increased to the specified value d, the relative revolution speed of the 2nd-speed hydraulic clutch 36 in relation to the clutch plate 37 becomes zero. In this condition, if the 2nd-speed hydraulic clutch 36 is engaged and the 3rd-speed hydraulic clutch 40 is disengaged, 2nd reverse speed (R2) will be obtained.

The operation for controlling the mechanical transmission unit 24 and the hydrostatic transmission unit 25 will be explained below.

In FIG. 2, the output shaft 22 of the engine 21 is provided with an engine revolution speed detector 70 for detecting the revolution speed of the output shaft 22 to detect the revolution speed $n_E$ of the engine 21, and the output shaft 54 of the variable displacement motor 53 in the hydrostatic transmission unit 25 is provided with a motor revolution speed detector 71 for detecting the revolution speed $n_m$ and revolution direction of the variable displacement motor 53. An engine throttle (not shown) is provided with a throttle position detector 72 for detecting the position X of the engine throttle manipulated. A change lever (not shown) is provided with a lever position detector 73 for detecting the lever position FNR (i.e., forward(F), neutral(N) or reverse (R)) of the change lever manipulated. The engine revolution speed detector 70, motor revolution speed detector 71, throttle position detector 72 and lever position detector 73 issue an engine revolution speed signal, motor revolution speed signal, throttle position signal and lever position signal respectively to a control unit 74.

The control unit 74 is composed of a central processing unit (CPU) 74A for executing a specified program, a read only memory (ROM) 74B for storing the specified program and various tables, and a random access memory (RAM) 74C serving as a working memory necessary for executing the specified program. The control unit 74 executes arithmetic processing by executing the specified program in accordance with the engine revolution speed signal, motor revolution speed signal, throttle position signal and lever position signal, and issues a shift control signal to a shift valve 75. In response to the shift control signal, the shift valve 75 executes the above-described engagement/disengagement of the reverse hydraulic clutch 32, forward hydraulic clutch 33, 2nd-speed hydraulic clutch 36, 3rd-speed hydraulic clutch 40 and 1st-speed hydraulic clutch 42. The control unit 74 also supplies an angle control signal to a valve 76 for changing the angle of the discharge controlling variable-angle swash plate 50a of the variable displacement pump 50 and to a valve 77 for changing the angle of the discharge controlling variable-angle swash plate 53a of the variable displacement motor 53, respectively.

A target engine revolution speed $N_E$ for the engine 21 is obtained according to the position X of the engine throttle and a control direction for speed ratio is obtained according to the lever position FNR of the change lever. Hence, speed ratio control is performed in the control unit 74 as shown in Table 1. This control is based on (i) the condition (positive, negative, or zero) of the actual speed ratio e; (ii) the relationship between the actual engine revolution speed $n_E$ that is obtained from the engine revolution speed signal from the engine revolution speed detector 70 and the target engine revolution speed $N_E$ that is obtained from the throttle position signal from the throttle position detector 72; and (iii) the lever position FNR obtained from the lever position signal from the lever position detector 73.

TABLE 1

| Actual Speed Ratio e | Relationship Between actual Engine Revolution Speed $N_E$ And Target Engine Revolution Speed $N_E$ | Lever Position FNR | Speed Ratio Control |
| --- | --- | --- | --- |
| >0 | $n_E > N_E$ | forward | increase to positive |
| >0 | $n_E < N_E$ | | decrease to zero |
| =0 | $n_E < N_E$ | | maintain at zero |
| ≧0 | $n_E = N_E$ | | maintain constant |
| <0 | $n_E \geqq N_E*$ | | increase to zero |
| >0 | $n_E \geqq N_E*$ | neutral | decrease to zero |
| =0 | $n_E \geqq N_E*$ | | maintain at zero |
| <0 | $n_E \geqq N_E*$ | | increase to zero |
| ≦0 | $n_E > N_E$ | reverse | decrease to negative |
| <0 | $n_E < N_E$ | | increase to zero |
| =0 | $n_E < N_E$ | | maintain at zero |
| ≦0 | $n_E = N_E$ | | maintain constant |
| >0 | $n_E \geqq N_E*$ | | decrease to zero |

With reference to the flow chart of FIG. 4 which shows a basic program, each step of the engine revolution speed control that is performed by controlling the speed ratio will be described in detail.

A: According to the throttle position signal from the throttle position detector 72, the target engine revolution speed $N_E$ of the engine 21 for the throttle position X is firstly obtained through arithmetic operation which includes conversion and is performed using the preliminarily stored characteristic function or table. The characteristic function or table is set based on the characteristic curve of the target engine revolution speed $N_E$ plotted against the throttle position X, the characteristic curve being prepared from the characteristic curve of torque plotted against the revolution speed of the engine 21.

B–D: The speed range presently selected in the mechanical transmission unit 24 which is controlled by the control unit 74 with the help of the shift valve 75 is detected. From the actual engine revolution speed $n_E$ indicated by the engine revolution speed signal from the engine revolution detector 70 and the actual motor revolution speed $n_m$ indicated by the motor revolution speed signal from the motor revolution speed detector 71, an actual motor speed ratio $e_m$ (the ratio of the actual motor revolution speed $n_m$ to the actual engine revolution speed $n_E$ (=$n_m/n_E$)) is obtained by arithmetic operation. The present, actual speed ratio e is obtained by converting the actual motor speed ratio $e_m$ in accordance with the detected control state of the present speed range, by the use of the preliminarily stored characteristic function $e=f(e_m)$ or table. The characteristic function $e=f(e_m)$ is set in accordance with the characteristic curve (see FIG. 3) of the actual motor speed ratio $e_m$ plotted against the actual speed ratio e.

E: How to drive the vehicle, namely, which of the following operations should be performed, is judged from the lever position signal from the lever position detector 73 and the present, actual speed ratio e.

(1) Forward moving or reverse moving of the vehicle is maintained.

(2) The vehicle is gradually stopped by the engine brake (engine brake control).

(3) The vehicle is immediately stopped during forward or reverse moving and then moved off again in a reverse direction (FR shift control).

(4) The vehicle is stopped (neutral control).

F: The value of the constant k (k represents the response to variations in engine revolution and its unit is 1/rpm) is obtained to be substituted in the following equation (1) for slowing down the response of the vehicle to load fluctuation during digging operation in order to free the operator from extra blade operation for vehicle speed control.

G: In the case of the engine brake control mentioned above, the target engine revolution speed $N_E$ is fixed at a specified value (e.g., 2,200 rpm) which is more than the maximum revolution speed of the engine throttle (=2,100 rpm), so that the vehicle speed is reduced. In addition, a specified restriction is placed in the speed reduction which is determined by $k(n_E-N_E)$ according to the presently selected speed range. This restriction brings the vehicle to a smooth, natural stop.

H: The target speed ratio E is obtained from the above target engine revolution speed $N_E$, actual speed ratio e and actual engine revolution speed $n_E$, using the following equation (1).

$$E=e+k(n_E-N_F) \qquad (1)$$

I: The change rate of the target speed ratio E per unit time is limited. This reduces the acceleration of the vehicle at the initial stage of digging and therefore allows the operator to be free from extra blade operation for vehicle speed control, particularly when digging ground that is too hard to strike into by the blade.

J: The target speed ratio E is limited by operating the speed control lever, and the target speed ratio E is also limited in a case, for example, in which the turning radius of the vehicle is reduced when the steering lever is operated excessively beyond a specified displacement range at the time of high-speed vehicle moving.

K: The sequential values for the target speed ratio E are so determined as to decrease step by step in order to immediately stop the vehicle at the time of the forward/reverse speed shift control (FR shift control).

L: The target speed ratio E is fixed at zero in order to securely stop the vehicle at the time of the neutral control (N control).

M: Since there is a limit in the range of the target speed ratio E for each speed range, the value of the target speed ratio E is limited for each speed range.

N: A target motor speed ratio $E_m$ is obtained by converting the target speed ratio E in accordance with the control state of the speed range presently selected in the mechanical transmission unit 24. In this conversion, a characteristic function $E_m=f(E)$ or table, which is a characteristic curve slimier to FIG. 3 and preset according to the characteristic curve of the target motor speed ratio $E_m$ plotted against the target speed ratio E, is used.

O: An operation amount A is obtained by adding a feed forward amount $KE_m$ (K: feed forward coefficient) which is proportional to the target motor speed ratio $E_m$ to the sum of the proportional component and integral component of the difference ($=E_m-e_m$) between the target motor speed ratio $E_m$ and the actual motor speed ratio $e_m$. This operation amount A is released as an angle control signal to the angle changing valves 76 and 77.

Accordingly, the actual motor speed ratio $e_m$ is adjusted to be equal to the target motor speed ratio $E_m$ and the actual speed ratio e is adjusted to be equal to the target speed ratio E, so that the actual engine revolution speed $n_E$ is adjusted to be equal to the target engine revolution speed $N_E$ corresponding to the throttle position X of the engine throttle.

Figure 5A:
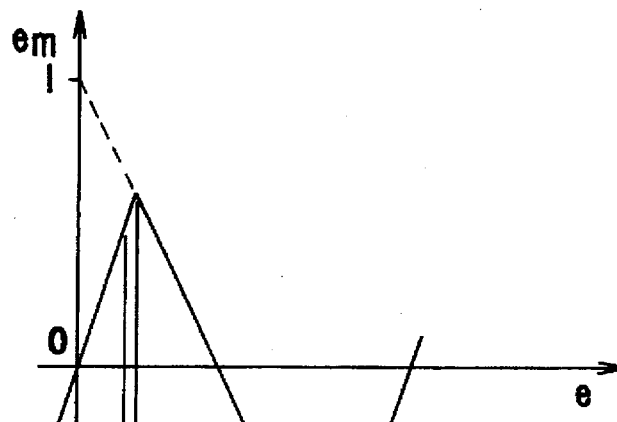
FIG. 5(a) is a graph of actual motor speed ratio $e_m$ verses actual speed ratio e.
Figure 5B:
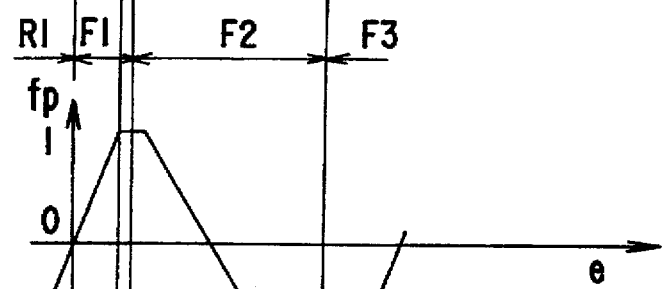
FIG. 5(b) is a graph of the volumetric efficiency $f_p$ of a pump verses the actual speed ratio e.
Figure 5C:
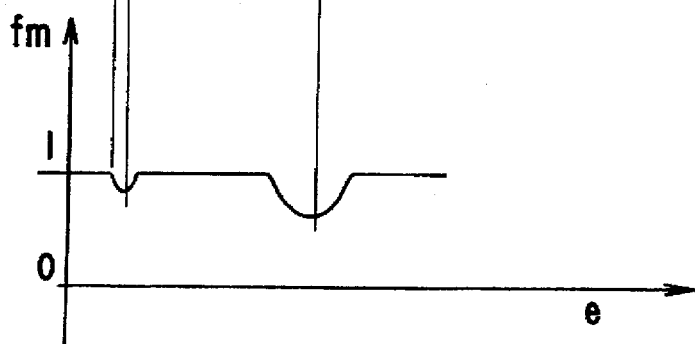
FIG. 5(c) is a graph of the volumetric efficiency $f_m$ of a motor verses the actual speed ratio e.

Referring to the graphs of FIGS. 5(a) to 5(c) which shows the relationship between the actual speed ratio e and actual motor speed ratio $e_m$ (5a); the relationship between the actual speed ratio e and pump volumetric efficiency $f_p$ (5b); and the relationship between the actual speed ratio e and motor volumetric efficiency $f_m$ (5c), the operation of the discharge controlling variable-angle swash plates 50a, 53a at the time of shifting from 1st forward speed (F1) to 2nd forward speed (F2) will be hereinafter described.

In the region of 1st forward speed (F1), if the discharge controlling variable-angle swash plate (pump swash plate) 50a for the variable displacement pump 50 is so operated that the pump volumetric efficiency $f_p$ is raised from zero to the maximum value, the motor speed ratio $e_m$ increases in the positive direction while the revolution speed of the output shaft 26 increases from zero in the positive direction. At the time when the pump volumetric efficiency $f_p$ reaches the maximum value, the angle of the discharge controlling variable-angle swash plate (motor swash plate) 53a for the variable displacement motor 53 is reduced so that the revolution speed of the motor 53 increases. After the angle of the motor swash plate 53a has been increased, thereby reducing the revolution speed of the motor 53, the pump swash plate 50a is moved from the maximum positive position to the maximum negative position, thereby reducing the motor speed ratio $e_m$. This allows the revolution speed of the output shaft 26 to increase in the positive direction.

In the course of the above operation, if an excessive load is imposed on the vehicle due to heavy-load work such as removing obstructive lying-stones, ripping or digging and piling up soil, so that the oil pressure in the hydraulic circuit for the hydrostatic transmission unit 25 exceeds a relief pressure, either of two kinds of relief controls (i.e., 1st-speed relief control or 2nd-speed relief control) will be performed depending on, in this embodiment, whether the speed range selected during relief is 1st speed (F1, R1) or 2nd speed (F2, R2). Next, the 1st-speed relief control and 2nd-speed relief control will be described.

(1) 1st-speed relief control

When the vehicle is moving in 1st speed, if the motor revolution speed $n_m$ does not increase although a certain driving signal is issued to the pump swash plate 50a, "the hydraulic relief state" is detected. This hydraulic relief state is thought to occur owing to the situation in which the angle of the motor swash plate 53a is reduced, and hence if the hydraulic relief state is detected, the motor swash plate 53a will be fixed at its maximum angle while the angle of the pump swash plate 50a being limited within 50% of its maximum value. During the time such relief control is performed, if it is detected the variable displacement motor 53 has started revolution or that the forward/reverse drive lever is placed in the neutral (N) position, this relief control is interrupted to resume the normal control.

(2) 2nd-speed relief control

If the hydraulic relief state occurs owing to heavy-load work during 2nd speed, shift down from 2nd speed to 1st speed cannot be performed so that the vehicle will be in the condition indicated by the dotted line in FIG. 5(a) and then come to stop because the speed ratio e rapidly decreases to zero. For avoiding such an undesirable situation, when the hydraulic relief state is detected, control is performed such that the hydraulic clutches in the mechanical transmission unit 24 are once disengaged to shift down to 1st speed and to resume the tractive force of the vehicle so that the vehicle can be moved off again in 1st speed. If the transmission is shifted to 2nd speed immediately after moving the vehicle off in 1st speed, it will cause undesired hunting in which relief in 2nd-speed and moving off in 1st-speed repeatedly take place. Therefore, specified conditions are established to prevent shifting to 2nd speed immediately after moving off. The 2nd-speed relief control is interrupted under the same conditions as the 1st-speed relief control is interrupted.

Figures 6, 6A:
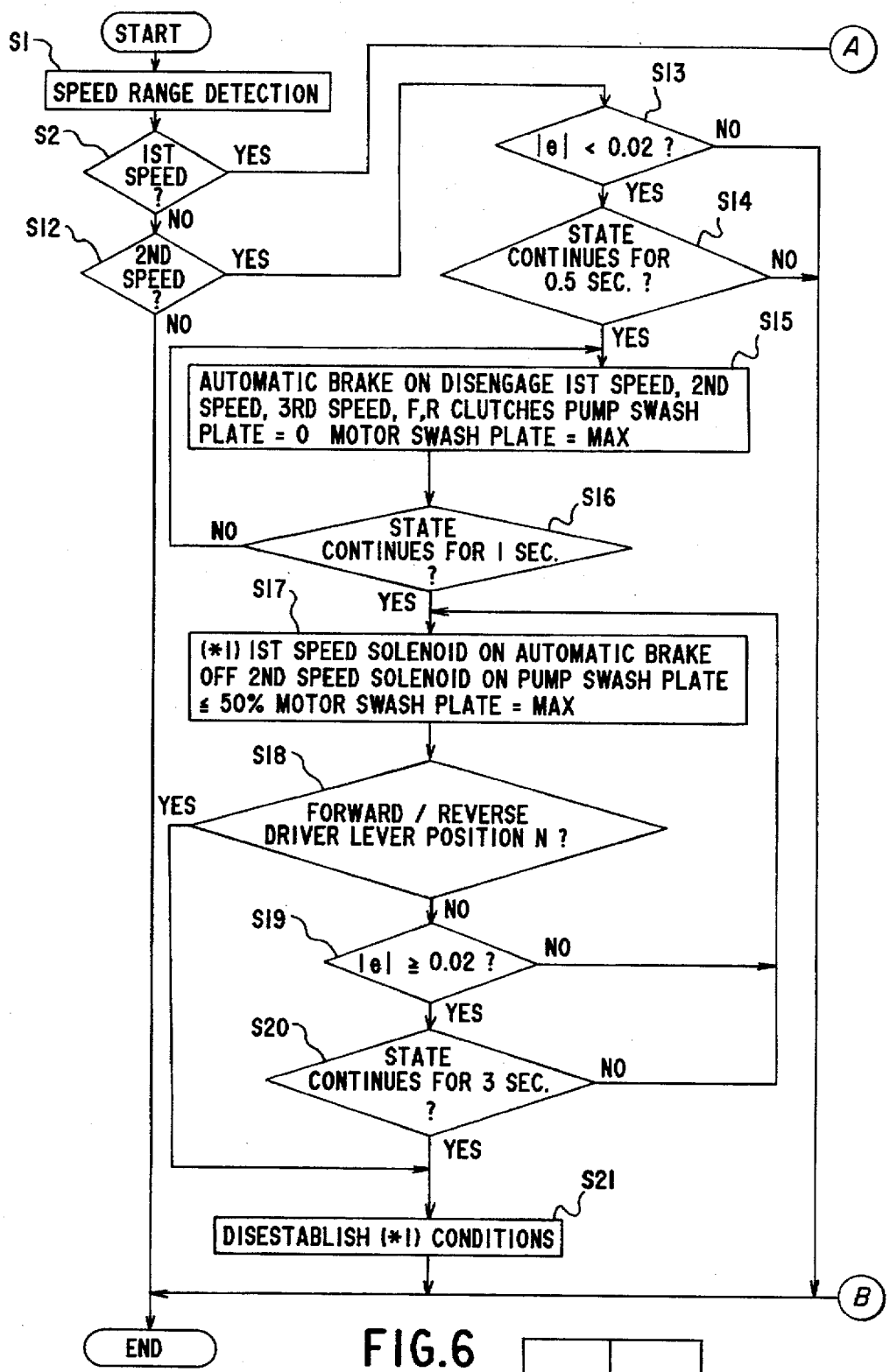
Figure 6B:
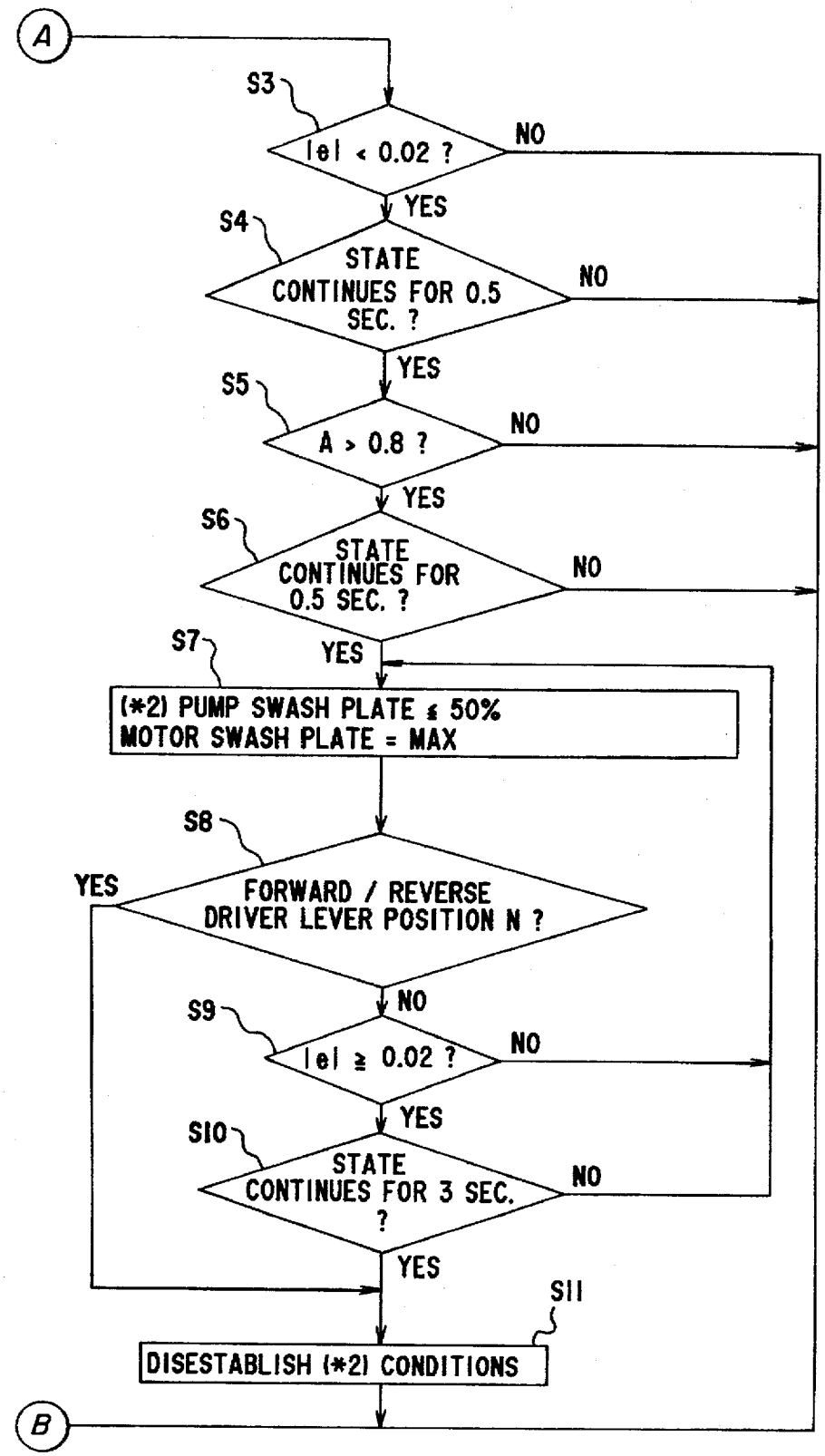

Reference will be made to the flow chart of FIG. 6, to give a step-wise, detailed description on the 1st-speed relief control and 2nd-speed relief control.

S1: The presently selected speed range is detected.

S2: It is determined whether or not the detected speed range is 1st speed. If so, the program proceeds to step S3 and if not, the program proceeds to step S12.

S3 to S7: For determining if the variable displacement motor 53 is in rotational motion, it is determined whether the absolute value |e| of the actual speed ratio e is less than 0.02 (S3) and whether the state in which the absolute value |e| is less than 0.02 continues for 0.5 second (S4). For determining if a driving instruction has been issued to the variable displacement pump 50, it is determined whether the volumetric efficiency A ($=f_p/f_m$) is more than 0.8 (S5) and whether the state in which the volumetric efficiency A is more than 0.8 continues for 0.5 second (S6). If these conditions are met, the angle of the pump swash plate 50a is set to 50% of its maximum value or less and the motor swash plate 53a is fixed at its maximum angle, for performing the 1st-speed relief control (S7). On the other hand, if any of the conditions in Steps S3 to S6 is not met, there is no need to perform the relief control, so that the flow is terminated.

S8 to S11: For disestablishing the conditions set for performing the 1st-speed relief control in step S7, it is determined whether the forward/reverse drive lever has been placed in the neutral (N) position (S8). If not, it is then determined whether the absolute value |e| of the actual speed ratio e is 0.02 or more (S9) and whether the state in which the absolute value |e| is 0.02 or more continues for 3 seconds (S10). If the forward/reverse drive lever is in the neutral position, or if the state in which $|e| \geq 0.02$ continues for 3 seconds, the conditions set in step S7 are disestablished (S11). If |e|<0.02 or if the state in which $|e| \geq 0.02$ does not continue for 3 seconds, the program will return to step S7 to continue the 1st-speed relief control.

S12: It is determined whether or not the detected speed range is 2nd speed. If so, the program will proceed to step S13 and if not, the flow will be terminated since there is no need to perform the relief control.

S13 to S17: In order to determine if the variable displacement motor 53 is in rotational motion, it is determined whether the absolute value |e| of the actual speed ratio e is less than 0.02 (S13) and whether the state in which the absolute value |e| is less than 0.02 continues for 0.5 second (S14). If these conditions are met, the automatic brake is actuated, the hydraulic clutches for 1st speed, 2nd speed, 3rd speed, F and R are disengaged, and the angle of the pump swash plate 50a is set to zero while the motor swash plate 53a being fixed at its maximum angle, whereby the vehicle is moved off again in 1st speed (S15). Then, it is determined whether 1 second has elapsed after the establishment of the conditions in step S15 (S16). If so, the 1st-speed solenoid is energized, the automatic brake is released, the 2nd-speed solenoid is energized and the angle of the pump swash plate 50a is set to 50% of its maximum value or less while fixing the motor swash plate 53a at its maximum angle (S17). On the other hand, if |e|≧0.02 or if the state in which |e|<0.02 does not continue for 0.5 second, the flow will be terminated since there is no need to perform the relief control.

S18 to S21: In order to disestablish the conditions set for the 2nd-speed relief control in step S17, it is determined like the case of the 1st-speed relief control whether the forward/reverse drive lever has been placed in the neutral position (S18). If not, it is then determined whether the absolute value |e| of the actual speed ratio e is 0.02 or more (S19) and whether the state in which the absolute value |e| is 0.02 or more continues for 3 seconds (S20). If the forward/reverse drive lever is in the neutral position or if the state in which |e|≧0.02 continues for 3 seconds, the conditions set in step S17 will be disestablished (S21). On the other hand, if |e|<0.02 or if the state in which |e|≧0.02 does not continue for 3 seconds, the program will return to S17 to continue the 2nd-speed relief control.

While the equation (1) is used for obtaining the target speed ratio E in the foregoing embodiment, the following equation may be used.

$$E = e \times (n_E/N_E)$$

Alternatively, the target speed ratio E' in the preceding cycle may be substituted in the following equation.

$$i\ E = E' + k(n_E - N_E)$$

The following equation may be also used.

$$E = E' \times (n_E/N_E)$$

In this case, there is no need to obtain the actual speed ratio e in order to obtain the target speed ratio E.

Although the actual motor speed ratio $e_m$ is obtained directly from the ratio of the revolution speed of the motor to the revolution speed of the engine, it may be obtained in other ways. For example, the revolution speed of the input shaft 23 and that of the output shaft 26 are detected taking the reduction ratio of the engine 21 etc. into account, and the actual motor speed ratio $e_m$ is obtained from the ratio of the revolution speed of the output shaft 26 to the revolution speed of the input shaft 23. Another alternative is such that the revolution speed of the input shaft 23 and that of the output shaft 54 of the variable displacement motor 53 are detected and the actual motor speed ratio $e_m$ is obtained from the ratio of the revolution speed of the motor 53 to the revolution speed of the input shaft 23. In these cases, the target revolution speed of the input shaft 23 for the throttle position X may be obtained from a throttle position signal from the throttle position detector 72, and the target motor speed ratio $E_m$ may be obtained through the arithmetic operation in which the target speed ratio of the revolution speed of the output shaft 26 to the revolution speed of the input shaft 23 is obtained by converting the actual motor speed ratio $e_m$ into the speed ratio of the revolution speed of the input shaft 23 to the revolution speed of the output shaft 26. In addition, the actual motor speed ratio may be obtained from the ratio of the revolution speed of the output shaft 26 to the revolution speed of the engine 21 or the ratio of the revolution speed of the motor 53 to the revolution speed of the output shaft 26, taking the reduction ratio of the engine 21 etc. into account.

In the foregoing embodiment, the angle of the discharge controlling variable-angle swash plate 50a for the variable displacement pump 50 and that of the discharge controlling variable-angle swash plate 53a for the variable displacement motor 53 are controlled in accordance with the operation amount A by means of the angle changing valves 76, 77 respectively. However, the angle of either of the discharge controlling variable-angle swash plates 50a and 53a may be controlled.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control system for controlling a hydrostatic-mechanical transmission when an oil pressure in a hydraulic circuit for a hydrostatic transmission unit of the transmission exceeds a relief pressure, the hydrostatic-mechanical transmission being equipped with a mechanical transmission unit actuated through an input shaft connectable to a power source; the hydrostatic transmission unit which is connectable to the input shaft and comprises a pump and motor having their respective discharge controlling swash plates, the angle of at least either of the swash plates being variable; a differential unit, having an output shaft, for actuating both the mechanical transmission unit and the hydrostatic transmission unit; and a motor revolution speed detecting means for detecting a revolution speed of said motor, the control system comprising:

(a) relief state detecting means for detecting that the hydraulic circuit is in a hydraulic relief state in which the oil pressure in the hydraulic circuit exceeds the relief pressure; and (b) relief control means for reducing the angle of the discharge controlling swash plate for the pump to a specified value or less, when the hydraulic relief state is detected by the relief state detecting means.

2. The control system as claimed in claim 1, wherein the relief state detecting means detects that the hydraulic circuit is in the hydraulic relief state if the revolution speed of the motor does not increase when a signal for instructing the actuation of the discharge controlling swash plate for the pump is issued.

3. The control system as claimed in claim 1, wherein the relief control means not only reduces the angle of the discharge controlling swash plate for the pump to the specified value or less, but also actuates an automatic brake and disengages hydraulic clutches in the mechanical transmission unit in order to shift the transmission into a lower speed range, if the relief state detecting means detects that the hydraulic circuit is in the hydraulic relief state during moving of a vehicle in a high speed range.

4. The control system as claimed in claim 1, wherein said specified value is 50% of the maximum angle of the discharge controlling swash plate for the pump.

5. The control system as claimed in claim 1, wherein the relief control means fixes the angle of the discharge controlling swash plate for the motor at its maximum value, if the hydraulic relief state is detected by the relief state detecting means.

6. The control system as claimed in any one of claims 1 to 5, further comprising:

relief control interrupting means for interrupting the control performed by the relief control means in a condition in which the angle of the discharge controlling swash plate for the pump is reduced to the specified value or less by the relief control means, if either the revolution speed of the motor increases or if a forward/reverse drive lever is operated.

* * * * *